United States Patent [19]

Eppler et al.

[11] 3,871,890

[45] Mar. 18, 1975

[54] COMPOSITION AND PROCESS FOR GLAZING CERAMIC WARE

[75] Inventors: Richard Andrew Eppler, Timonium; Eugene F. O'Conor, Baltimore, both of Md.

[73] Assignee: SCM Corporation, Cleveland, Ohio

[22] Filed: Nov. 19, 1973

[21] Appl. No.: 417,126

Related U.S. Application Data

[62] Division of Ser. No. 207,522, Dec. 13, 1971, Pat. No. 3,804,666.

[52] U.S. Cl.................. 106/48, 106/39.7, 106/49
[51] Int. Cl....... C03c 3/04, C03c 5/02, C04b 33/00
[58] Field of Search.................. 106/39.7, 48, 49

[56] References Cited
UNITED STATES PATENTS

| | | | |
|---|---|---|---|
| 2,563,502 | 8/1951 | Swes | 106/48 |
| 2,706,692 | 4/1955 | Chester | 106/48 |
| 3,006,775 | 10/1961 | Chen | 106/39.7 |
| 3,298,860 | 1/1967 | Bryant et al. | 106/48 |
| 3,380,838 | 4/1968 | Sack | 106/48 |
| 3,561,984 | 2/1971 | Eppler | 106/48 |
| 3,565,644 | 2/1971 | Eppler | 106/48 |
| 3,676,204 | 7/1972 | Eppler | 117/125 |
| 3,804,666 | 4/1974 | Eppler et al. | 106/48 |

*Primary Examiner*—Winston A. Douglas
*Assistant Examiner*—Mark Bell
*Attorney, Agent, or Firm*—Richard H. Thomas

[57] ABSTRACT

Disclosed are compositions and methods for glazing low-expansion ceramic ware with an opaque, non-porous, acid-resistant, low-expansion, semi-crystalline glass-ceramic glaze which can be subjected to relatively high firing temperatures (relatively high with respect to firing temperatures for low-expansion glazes) without the formation of "wash boarding" or other surface defects associated with overfiring. The compositions are lithium aluminosilicate frits containing sufficient $ZrO_2$ so that zirconia is present as a crystalline phase in the fired glaze. The invention shows particular advantage for making glazes of adjustable and low expansion for thermal shock-resistant ceramic whiteware, for example, dinnerware, cookware and ceramic tile.

7 Claims, No Drawings

COMPOSITION AND PROCESS FOR GLAZING CERAMIC WARE

This application is a division of application Ser. No. 207,522, filed Dec. 13, 1971, now U.S. Pat. No. 3,804,666.

This application is related to U.S. Pat. Nos. 3,561,984 and 3,565,644, the disclosures of which are incorporated by reference.

This invention relates to a composition for glazing ceramic aware, preparations useful for making said composition, process for glazing ceramic bodies and substrates with said compositions and the resulting coated ceramic bodies.

In commonly assigned U.S. Pat. Nos. 3,561,984 and 3,565,644 to R. A. Eppler are disclosed low-expansion compositions and methods for glazing low-expansion whiteware bodies with a nonporous, semi-crystalline, glass-ceramic glaze. These glazes have achieved significant industrial acceptance and have opened up a whole new area of research and development in the field of low-expansion glazing. This research has indicated a commercial need for low-expansion glazes which are resistant to overfiring, are more completely opaque and fire at temperatures easily maintained in currently installed commercial firing equipment.

The coefficient of thermal expansion of glass-ceramic, semi-crystalline, low-expansion glazes of a given composition is a function of the firing time and temperature in that the content and composition of the crystalline phases are determined by the firing time and temperature. Unfortunately due to the firing cycles of more conventional vitreous glazes, many whiteware manufacturers are equipped for particular conditions of time and temperature for their glazing applications which are higher in temperature than is most suitable for development of the crystals in the materials disclosed in U.S. Pat. Nos. 3,561,984 and 3,565,644; and inadvertent overfiring of the glazed ware often results. This overfiring has resulted in the formation of a surface defect known "wash boarding" or "wrinkling" which is an imperfection in the form of ripples or waves on the surface of the glazed body. It has also been recognized that many whiteware applications require a low-expansion glaze that is quite opaque rather than delicately translucent as often achieved with the glazes of U.S. Pat. Nos. 3,561,984 and 3,565,644.

Accordingly, it is the primary object of the present invention to provide a low-expansion glaze composition and method which is adapted for glazing low-expansion ceramic whiteware with a substantially nonporous glaze which after melting into the fluent, vitreous state is thermally autocrystallizable to a low-expansion, semi-crystalline glass-ceramic opaque glaze having a coefficient of expansion less than $5 \times 10^{-6}$/°C. which is adapted for firing at selected elevated temperatures, which match the temperatures attainable in currently installed kilns.

The instant invention is to be distinguished from conventional operations for making semi-crystalline glazes for artistic purposes because such conventional glazes contain crystals having average coefficient of thermal expansion above $5 \times 10^{-3}$/°C. Such glazes are not useful for glazing high petalite or cordierite bodies or other bodies of similarly low thermal expansion.

Furthermore, the instant invention is to be distinguished from the conventional preparation of devitrified glass bodies typified by the well-known Pyroceram product and related processes (the term "Pyroceram" being a trademark of Corning Glass Works). Typically, in the preparation of such divitrified glass forms, the formulation and operation is directed to induce crystallization in glass at a fairly low temperature so as to maintain dimensional stability of the form. Practically a minimum viscosity of $10^9$ poises is required; preferably a minimum viscosity of $10^{11}$ poises should be used. In contrast the present invention is directed to obtain working fluency of the molten devitrifiable material so it will coat a body efficiently, the viscosity in this condition being typically several powers of 10 less than the glass in the conventional glass devitrifying operation. Fluid viscosity of a typical inventive composition at useful firing temperatures was measured at between $10^5$ and $10^6$ poises using the concentric cylinder method (R. A. Eppler, J. Am. Cer. Soc. 49(12):679, December, 1966).

The instant particulate vitrifiable material in the composition for glazing must have at least a substantial fraction already in the vitreous state to obtain the desired interaction for the instant operation; and the most practical way to achieve the glazing is to heat the instant bisque coating beyond the liquidus of any crystals present, then reduce temperature for the crystal growing step. In contrast, the normal heating path for making low-expansion devitrified bodies, e.g., as shown in U.S. Pat. Nos. 3,006,775; 3,252,811; 2,920,921; 3,161,528 and 3,272,610 is to make a glass body in the conventional sense, the body being formed in desired shape so that it is extremely highly viscous and dimensionally stable, give it a comparatively low temperature nucleating "soak" to maximize the viscosity within the body, then raise the temperature of the body to a temperature which is below the liquidus of the crystals being formed. U.S. Pat. No. 3,084,053 first converts the glass to frit, aggregates the frit into desired shape, then treats similarly.

According to another feature of the present invention, it is unnecessary to incorporate titania into the preparation to induce the nucleation or growth of the low-expansion lithium aluminosilicate crystalline phases during the subsequent heat treatment. The amounts and proportions of $Li_2O$, $Al_2O_3$ and $SiO_2$ in the preparations are specified so that the appropriate low-expansion phases are self-nucleating or autocrystallizable under the influence of the energy supplied by the specified heat treatment.

This is an important advantage in the glazing of ceramic whitewares because titania detracts from the color and appearance of the finished glazed product. It is a commonly employed nucleant in crystallizable glazes. Unfortunately, the presence of this titania tends to cause a mottled appearance as well as a brown discoloration in the fired glaze. Mottling and brown discoloration are undesirable and commercially unacceptable for many whiteware applications. Additionally, titania nucleated glazes are often very low in gloss and have a dull or matte appearance. Selfnucleated glazes of the present invention can be bright, white or ivory in color and glossy.

The solubility of zirconia in the lithium aluminosilicate glaze composition field described herein is about 5% by weight. In U.S. Pat. Nos. 3,561,984 and 3,565,644, the 5% solubility range was used as the upper limit for defining useful frit compositions to restrict the precipitation of zirconia. It was believed that substantial amounts of crystalline zirconia, having an average coefficient of thermal expansion of about 4.5 × $10^{-6}$/°C. would be detrimental to glaze performance.

Surprisingly, it has been found that significant amounts of a zirconia containing crystalline phase, crystallizing together with certain alumino-silicates, materially alters the firing range of the glaze and contributes glaze opacity and chemical durability while maintaining the thermal expansion coefficient in the range of 2 × $10^{-6}$ to 5 × $10^{-6}$/°C.

In one aspect of the invention is a composition for glazing ceramic ware comprising 100 parts of particulate vitrifiable material, at least a substantial fraction of which initially is in the vitreous state, said vitrifiable material, after melting into a fluent vitreous state, being partially devitrifiable and crystallizable into a substantially dimensionally stable, continuous, vitreous coating in which are dispersed crystals having average coefficient of thermal expansion less than 4 × $10^{-6}$/°C.; 0 to 15 parts ceramic clay (other than montmorillonite clay); 0 to 5 parts of a montmorillonite (such as bentonite) as a suspending assistant; 0 to 20 parts of ceramic colorant or stain; 0 to 20 parts ceramic opacifier such as zirconia, titania, tin oxide or cerium oxide; 0 to 0.4 part electrolyte for suspending, dispersing, peptizing and/or thickening such as calcium chloride, sodium silicate, sodium tetrapyrophosphate, methyl cellulose, and sodium carboxy methyl cellulose; and 0 to 90 parts water.

Typical water concentrations in a resulting slip can be between about 15 and about 90 parts per 100 parts of the particulate vitrifiable material, for example, 20 to 40 parts for a dipping application of the glazing composition; 70 to 90 parts for roller coat application; and 60 to 80 parts for spray application. Other forms of application can include waterfall glazing of the ceramic body or substrate, or brushing or blade application of such slip.

The particulate vitrifiable material useful for partially devitrifying or crystallizing into the low-expansion glaze having a continuous vitreous phase should be at least partially in the vitreous state initially. Suitably at least the water soluble constituents such as carbonates, borax, boric acid, sodium fluoride or potassium fluoride should be combined as vitreous matter so as to resist water solution. It is especially desirable to have no more than 1 percent by weight of the particulate devitrifiable material extractable in water at room temperature when 100 grams of the material of a particle size passing a 100-mesh Tyler Screen and being retained on a 200-mesh Tyler Screen are suspended in 1,000 ml. of water. Advantageously, the particulate vitrifiable material is at least 10 to 15% by weight in the vitreous state as frit particles and even higher to achieve best interaction of all the components in subsequent firing and resulting glazing. For example, the particulate vitrifiable material can be petalite mixed with other materials which are entirely in the vitreous state as a frit or a mixture of frits. Preferably the entire particulate vitrifiable material in the composition other than the listed mill additions is a frit or a mixture of frits. The optional stains, opacifiers, clay, bentonite and other solids can be mixed intimately into the composition as mill additives. Wet grinding of the composition ordinarily is practiced, but the solids can be ground dry if desired, with water added subsequently to the premilled solids to make a slip. To achieve best utility and performance there should be no more than about 3%, and preferably no more than about ½% of the particles retained on a 325-mesh (Tyler Standard) screen after milling of the composition for application to a ceramic body.

In order to obtain the glazing effectiveness, the particulate devitrifiable material must be meltable into a fluent vitreous state of comparatively low viscosity for flowing and spreading onto the ware and giving the glaze film. The particulate vitrifiable material of the composition can be thought of as basically three portions; the portion which in the glazing operation crystallizes or devitrifies to yield the necessary extremely low-expansion crystals, that which crystallizes or devitrifies to yield zirconia or zircon and a flux which makes substantially the balance of the material into a continuous vitreous film-forming matrix that resists devitrification under the glazing conditions.

To distinguish the particulate vitrifiable material useful in compounding the composition for glazing from the composition as a whole, which can include various mill additions, said particulate vitrifiable material by itself hereafter will be referred to as a "preparation." In another aspect of this invention particularly useful preparations are set forth which yield upon firing the required fluency for glazing and subsequently are crystallizable or devitrifiable into a dimensionally stable continuous vitreous coating in which are dispersed the very low-expansion crystals, as well as crystals of zirconia or zircon. The flux (which can be considered a diluent) reacts to make a glass of the preparation in the firing operation, the flux being fully soluble in the fluent melt.

Accordingly, the inventive preparations yielding the resulting low-expansion, semi-crystalline glass-ceramic, opaque glaze containing the aforementioned low-expansion crystals and zirconia containing crystals can be described as particulate mixtures providing a special resulting ingredient composition Sets I and II:

| I. Ingredient | Percent by Weight |
|---|---|
| $Li_2O$ | about 3 to 22% |
| MgO | about 0 to 6%, 0.74 part of MgO replacing 1 part of $Li_2O$ when MgO is used, but a minimum of 4% $Li_2O$ + MgO being present |
| $Al_2O_3$ | about 17 to 38% |
| $SiO_2$ | about 26 to 70%., the subtotal sum of $Li_2O$, MgO, $Al_2O_3$ and $SiO_2$ being 70 to 90% |
| $ZrO_2$ | about 6 to 25% |
| Flux | about 4 to 19% |
| wherein said flux is: $B_2O_3$, $K_2O$, F, PbO, $Na_2O$, CaO, SrO, ZnO, BaO up to 5% or mixtures of same. | |

Preferably, for obtaining the most practical low-expansion glazes useful in a wide variety of operations and meeting the many operational requirements in the ceramic industry for cookware and dinnerware manufacture, Set I is further restricted to Set II as follows:

| II. Ingredient | Percent by Weight |
|---|---|
| $Li_2O$ | about 5 to 15% |
| MgO | about 0 to 2½%, 0.74 part of MgO replacing 1 part of $Li_2O$ when MgO is used |
| $Al_2O_3$ | about 17 to 31% |
| $SiO_2$ | about 38 to 60%, the subtotal sum of the $Li_2O$, MgO, $Al_2O_3$ and $SiO_2$ being |

-Continued

| II. | Ingredient | Percent by Weight |
|---|---|---|
| | | 70 to 88% |
| | ZrO₂ | about 8 to 20% |
| | Flux | about 4 to 11% |

In all instances the ingredients in the foregoing preparations are vitrified to an extent at least sufficient for rendering such preparation substantially water resistant as hereinbefore described (so that application of the preparations to a substrate cannot involve an aqueous leaching away of the necessary interacting materials and resulting disproportionation of the preparation). Because some of the probable reactions that occur upon firing are diffusion-controlled reactions, extremely intimate and substantially homogeneous distribution of the reactants in close proximity to each other certainly is desirable for greatest reaction efficiency. Accordingly, it is advantageous that a substantial fraction of the preparations be in vitreous condition, and preferably that the preparation is a single frit or an intimate mixture of frits to insure intimacy of the interacting components as well as water resistance.

Basically to obtain the lowest expansion glaze, only enough flux is used to obtain the desired continuous vitreous surface which is adequately flowable into a coating film during the firing step, this minimum proportion of flux being as low as about 4% for some of the lithia-containing preparations. The upper limitation of the flux content on the preparation is determined by the overall thermal expansion coefficient of the composite glaze. The maximum flux content in any useful case with such preparations is about 19%, and in some instances, it must be less to keep within the necessary limits of thermal expansion.

Raw materials for providing for the ingredients of the preparations are those conventional in the glassmakers' art for supplying silica, alumina, and the other metal oxides for glass. The ingredients are provided alone or combined in various ways in minerals and chemicals. Purity of the raw materials mainly affects color of the glaze, thus the purer raw materials are more versatile.

The flux can be a single material, but most generally is a mixture or combination for efficiency or economy. The composition for glazing can be made boron-free, but $B_2O_3$ is advantageous to make the glaze most spreadable and fluent. Similarly, potassium oxide is desirable to promote gloss. A preferred flux is an approximately 50/50 mixture by weight of $B_2O_3$ and $K_2O$. The use of alkali metal oxides tend to raise the coefficient of thermal expansion of the vitreous phase in the resulting glaze. Flux materials that can be used include: $B_2O_3$ - suitably in the form of borax, boric acid and/or calcium borate; $K_2O$ - suitably in the form of potassium nitrate and/or potassium carbonate; F - suitably in the form of calcium fluoride, potassium silicofluoride, cryolite, sodium fluoride and/or potassium fluoride; PbO - suitably in the form of litharge and/or red lead ($Pb_3O_4$); soda - suitably in the form of sodium nitrate, sodium carbonate, borax, feldspar, and/or sodium fluoride; CaO - suitably in the form of whiting (calcium carbonate), calcium fluoride, wollastonite, and/or calcium feldspar; SrO - suitably in the form of strontium carbonate; and ZnO - suitably in this oxide form. The zirconia in the preparations can be added as such or more commonly as zircon ($ZrSiO_4$).

The particularly low average coefficient of thermal expansion of the crystals formed when the particulate vitrifiable material is partially devitrified or crystallized is the basis for the special utility of the instant composition for glazing ceramic ware. These crystals formed in the devitrification should have average thermal expansion less than $4 \times 10^{-6}/°C.$, suitably no more than about $2.5 \times 10^{-6}$ down to about $1 \times 10^{-6}$, or even no measurable coefficient or a slightly negative one such as minus $1 \times 10^{-6}$. Average thermal expansion of a crystal means that the expansion is averaged over all crystallographic directions. These crystals are held in a matrix or continuous vitreous coating to yield a substantially nonporous glaze over the ceramic substrate, which glaze can be made glossy or matte as necessary or desired for utility without deviation Prom invention principles.

The overall glaze composition after firing should have an overall coefficient of thermal expansion less than $5 \times 10^{-6}/°C.$, advantageously about $2 \times 10^{-6}$ to $4 \times 10^{-6}/°C.$, and preferably about $2 \times 10^{-6}$ to $3 \times 10^{-6}/°C$. The thermal expansion values spoken of in this specification in connection with glazes and bodies are the average linear thermal expansion coefficient of these materials for the temperature range of 50 to 450°C.

The low-expansion crystals formed on the ensuing crystallization or devitrification in the lithium-bearing preparations of this invention are primarily lithium alumino-silicate crystalline structures and can be the stuffed quartz structure as described in the Beall U.S. Pat. No. 3,252,811, $\beta$-eucryptite ($Li_2O . Al_2O_3 . 2 SiO_2$) and/or $\beta$-spodumene ($Li_2O . Al_2O_3 . 4 SiO_2$) (which has a coefficient not as low as that of stuffed quartz and therefore not considered as useful in all aspects of the invention). Another crystalline phase that is present in the glazes according to the present invention is zirconia ($ZrO_2$) or zircon (zirconium silicate) identified as such by X-ray diffraction analysis. It has now been discovered that the presence of a zirconia containing crystalline phase contributes thermal stability to the glaze and permits adjustment of the firing temperature to match the requirements of existing equipment. Furthermore, the presence of the zirconia phase in the glaze provides opacity in the glaze which is required for many whiteware applications.

The crystalline phases discussed above are identified by X-ray diffraction analysis, and accordingly the designation of the crystalline phases as "stuffed quartz," "$\beta$-eucryptite," "zirconiz," "zircon" and "$\beta$-spodumene" includes low-expansion lithium aluminosilicate crystalline phases and zirconium oxide phases which are so identified by X-ray diffraction.

In a further aspect of the invention, there is presented a process for glazing a ceramic body which comprises:
  a. at least partially coating the body with a composition for glazing of the type described herein;
  b. firing the resulting coated body at a temperature sufficiently high and for a time sufficiently long for converting said composition into a fluent, continuous, vitreous surface coating;
  c. then adjusting temperature to a value at which crystal growth in said vitreous surface coating occurs within not substantially more than several hours; and
  d. then cooling the resultant glazed ware at a rate consistent with keeping the ware integral.

The coating step preparatory to firing of the coated ceramic body can be done as previously described in connection with the composition for glazing, above, by spraying, dipping and other conventional techniques. In its unfired condition, the thus-coated ware can be considered as being in the bisque condition. The conventional two-fire system is to make the body, fire it at some high temperature, cool it, then apply the glazing material and refire at a lower temperature than that at which the body was fired. Other practices include that of coating the unfired (green) body and firing the glaze and body simultaneously. In some instances, manufacturers have found it desirable to form the body, fire it only to dryness at some low temperature, then apply the glaze and fir the coated body at a higher temperature. Hence, for the present purpose, the body can be preformed and fired, or green, or merely dried before application of the glaze, although the two-fire system is used most generally in the U.S. It is the most demanding on compositions for glazing, and the instant invention is specially suited for such system.

Minerals generally used in making up the bodies are cordierite, zircon, sillimanite, low-expansion fire clays and/or wollastonite. Most suitable bodies for the instant invention are those containing at least about 50% cordierite so that the body has desired low-expansion coefficient in the range of 3.5 to 4.0 $\times 10^{-6}$/°C. Typical bodies can be compounded for glazing having as a primary phase petalite, or talc (to produce a substantial cordierite phase) in combination with feldspars, clay, flint and/or silica. Bodies containing a high proportion of wollastonite also can be glazed suitably using glazes that fire at a temperature lower than that used in previously proposed glazing practice for this material (approaching 1,200°to 1,300°C.), this being a definite advantage of applying the principles of the invention to wollastonite glazing practice.

Particularly useful ceramic bodies for the present glazing process and for making the resulting glazed articles are those compounded with various low-expansion ceramic materials to give such body a thermal expansion coefficient between about $2 \times 10^{-6}$/°C. and about $8 \times 10^{-6}$/°C. and preferably between about $3 \times 10^{-6}$/°C. and about $6 \times 10^{-6}$/°C. For glazing of such body, the overall coefficient of thermal expansion of the instant compositions for glazing should be at least as low as the body to prevent crazing, advantageously about $1 \times 10^{-6}$/°C. lower than the body; for compression glazing this differential most desirably is $2 \times 10^{-6}$/°C. to $4 \times 10^{-6}$/°C., the body being the higher in expansion. Accordingly, the particular glaze composition utilized here should be matched to the body in differential of coefficient of thermal expansion, the differential being in any case measured at the intended use temperature or over the use temperature range of the resulting glazed ware. For cookware, thermal shock resistance is most desired over the operating temperature range of said ware. For dinnerware compression glazing most desirably is practiced for obtaining mechanical shock resistance at ordinary room temperatures and dishwashing temperatures. Selection of the instant glaze for the appropriate body to get a combination of thermal shock resistance and mechanical shock resistance is, of course, quite possible within the limits of this invention.

As an advantageous embodiment of this process, the firing is performed at a temperature not substantially more than about 500°C. above the liquidus of the composition for glazing to suppress a generally undesirable irregular effect known as "orange peeling" and to yield a smooth glaze without such surface irregularities. In most instances, the firing temperature will be about 100°to 300°C. or so above the liquidus of the composition for glazing. At the liquidus crystals can be present which prevent the necessary fluidity. The instantaneous fluid viscosity of the composition during the firing step shall be less than the softening point (as defined by the conventional ASTM procedure applied to glasses) which viscosity at softening point is about $10^{7.6}$ poises.

A useful firing temperature is from about 975°to 1,250°C. This is somewhat higher than the firing temperature suitable for firing the lithium aluminosilicate compositions of U.S. Pat. Nos. 3,561,984 and 3,565,644. By adjustment of the zirconia concentration, the firing temperature can be selected to match the capabilities of the available firing equipment.

The most practical procedures for adjusting temperature to a value at which crystal growth in the fluent vitreous coating occurs in a practical time, that is, in several minutes to at least within several hours, is to reduce the temperature after the firing step to a temperature below the liquidus of the highest melting crystal to be produced in the resulting vitreous matrix, although in some systems the temperature conceivably could be raised to obtain devitrification at the desired rate of crystal growth. As a practical matter the temperature stage for inducing crystal growth is a 650 to 850°C.

For each particular preparation and mill additions thereto, it should be understood, however, that there will be optimum temperatures to achieve this devitrification at a desired practical rate in a time not substantially more than several, i.e., 20 to 30 hours, and usually in a much shorter overall time, e.g., as little as 1 to 2 hours, to accommodate rapid production of glazed ware.

The final step in the glazing process is to cool at a rate that is not so fast as to cause undesirable cracking or crazing or undesirable strains in the resulting glazed object or its glazed surface, in other words, at a rate consistent with keeping the ware integral. The cooling can be done reasonably fast for production purposes, some systems being air-coolable from a temperature as high as about 816°C. to room temperature with the coated work merely maintained on a metal support. A practical rate of cooling is 1 to 10°C. per minute, and the cooling can be quite slow where long cooling times can be accommodated.

The following examples show various ways in which the invention has been practiced, but should not be construed as limiting the invention. All temperatures are shown in degrees centigrade. In this specification all percentages are weight percentages, and all parts are parts by weight unless otherwise expressly indicated.

To demonstrate the broad range of firing conditions that can be employed in firing the glazes of the present invention, the following firing cycles are employed in several of the examples. These firing cycles are defined at the outset for convenience in reference.

Firing Cycle 1

The glazed body was heated in a conventional Harper furnace at furnace rate (approximately 5 to 6 hours) to the maximum 1,050°C.; held for 1 hour and cooled at the furnace rate (approximately 10 hours) to room temperature.

Firing Cycle 2

Similar to Firing Cycle 1 except that the maximum firing temperature was 1,080°C.

Firing Cycle 3

Similar to Firing Cycle 1 except that the maximum firing temperature was 1,130°C.

Firing Cycle 4

Fired in a continuous tunnel kiln set at 1,100°C. with a 1-¾ hrs. elapsed time from entrance to exit. The fired body was then removed from the kiln and allowed to cool in air.

Firing Cycle 5

Similar to Firing Cycle 4 except that the firing temperature was 1,150°C. rather than 1,100°C.

Firing Cycle 6

The glazed body was placed in an oven preheated and maintained at 1,070°C. and held at this temperature for 1 hour after which the body was removed from the furnace and allowed to cool in air.

EXAMPLE 1

The following raw materials of the usual grade and quality for ceramic applications were weighed out and mixed in a twin-shell blender:

| | | |
|---|---|---|
| Potassium Nitrate | 54 | Parts |
| Boric Acid | 23 | do. |
| $Li_2CO_3$ | 50½ | do. |
| Zircon | 227 | do. |
| Calcined Alumina | 23 | do. |
| Spodumene | 473 | do. |

The batch was placed in a rotary smelter and smelted at 1,370°C. for 1 hour. It was then poured into water to frit it, and the frit was allowed to dry. The frit had the following composition:

| | | |
|---|---|---|
| $Li_2O$ | 6.88 | Percent |
| $K_2O$ | 3.46 | do. |
| $Na_2O$ | 0.18 | do. |
| $CaO$ | 0.43 | do. |
| $B_2O_3$ | 1.69 | do. |
| $Al_2O_3$ | 19.05 | do. |
| $SiO_2$ | 48.40 | do. |
| $ZrO_2$ | 19.47 | do. |
| $Fe_2O_3$ | 0.43 | do. |

The frit was then dried and ball milled for 16 hours. Subsequently, 100 parts of the ball-milled frit, 4 parts bentonite and 45 parts of water were ball milled together for 1 hour and the mixture sprayed onto several bisque-fired cordierite bodies having the following composition:

| | | |
|---|---|---|
| Kaolin Clay | 36.0 | Percent |
| Talc | 28.0 | do. |
| Alumina | 11.0 | do. |
| Zircon | 10.0 | do. |
| Spodumene | 7.0 | do. |
| Nepheline Syenite | 5.0 | do. |
| Zinc Oxide | 3.0 | do. |

The bodies had been bisqued at 1,230°C., and the coating was applied to a weight of ½ to 1 gram per square inch of surface area.

The coated bodies were divided into six groups, and one group was fired according to Firing Cycle 1; the second group according to Firing Cycle 2 and so on for each of the six firing cycles described above. In each of the six groups of bodies, the result was a moderate gloss, white, opaque, crazefree, non-porous, acid-resistant, semi-crystalline glaze on the tile body. The glaze had acid resistance of AA when tested according to ASTM Test C–282–67. The coefficient of expansion of the glaze in each case was observed to be about 2.8 to 3.0 × $10^{-6}$/ °C. which produced a compatible glaze on the cordierite body which had a coefficient of thermal expansion of about 3.5 to 4.0 × $10^{-6}$/ °C.

EXAMPLE 2

The following materials of grade and quality suitable for use in ceramic manufacturing were weighed out and mixed in a twinshell blender:

| | | |
|---|---|---|
| Silica | 293 | Parts |
| Feldspar | 8¼ | do. |
| Potassium Nitrate | 52½ | do. |
| Boric Acid | 23 | do. |
| $Li_2CO_3$ | 128 | do. |
| Zircon | 201 | do. |
| Nepheline Syenite | 1¼ | do. |
| Calcined Alumina | 143 | do. |

The batch was placed in a rotary smelter and smelted at 1,370°C. for 1 hour. It was then poured into water to frit it, and the frit was allowed to dry. The frit then had the following composition:

| | | |
|---|---|---|
| $Li_2O$ | 7.09 | Percent |
| $K_2O$ | 3.46 | do. |
| $Na_2O$ | 0.05 | do. |
| $B_2O_3$ | 1.76 | do. |
| $Al_2O_3$ | 19.74 | do. |
| $SiO_2$ | 49.73 | do. |
| $ZrO_2$ | 18.16 | do. |

The frit was then dried and ball milled for 16 hours. Subsequently, 100 parts of the ball-milled frit, 0.2 parts bentonite, 4 parts kaolin clay and 40 parts of water were ball milled together for 1 hour and the mixture sprayed onto several bisquefired cordierite bodies of the composition of Example 1.

The body had been bisqued at 1,230°C., and the coating was applied to a weight of ½ to 1 gram per square inch of surface area. The coated bodies were divided into six groups; and one group was fired according to Firing Cycle 1, the second group according to Firing Cycle 2 and so on for each of the six firing cycles described above. In each of the six groups of bodies, the result was a moderate gloss, white, opaque, crazefree, non-porous, acid-resistant, semi-crystalline glaze on the tile body. The glaze had an acid resistance of AA when tested according to ASTM Test C–282–67. The coefficient of expansion of the glaze in each case was observed to be about 2.8 to 3.0 × $10^{-6}$/ °C. which produced a compatible glaze on the cordierite body which had a coefficient of thermal expansion of about 3.5 to 4.0 × 10$^{-6}$/°C.

These Examples demonstrate that by increasing the content of zirconia in any given glaze composition within the $Li_2O \cdot Al_2O_3 \cdot SiO_2$ composition field described herein, the optimum firing temperature for the glaze composition increases proportionately. For instance, in the glaze composition:

| Oxide | Percent by Weight |
|---|---|
| $Li_2O$ | 9.47 |
| $K_2O$ | 4.65 |
| $B_2O_3$ | 2.34 |
| $Al_2O_3$ | 26.23 |
| $SiO_2$ | 55.00 |
| $ZrO_2$ | 2.31 | which is the type disclosed in U.S. Pat. Nos. 3,561,984 and 3,565,644, the optimum firing temperature is 1,900°F. (1,038°C.) for 1 hour. This is roughly equivalent to firing at Cone 02 on the Scale of Standard Pyrometric Cones. The optimum firing temperature for the glaze composition shown in Example 2 containing 18.16% zirconia is 2,050°F. (1,121°C.) for 1 hour. This is roughly equivalent to firing at Cone 4. Since these two compositions are similar except for the increase in zirconia in the composition herein at the proportional expense of the other ingredients, it is seen that the increase in firing temperature is directly related to the zirconia content. To give a rough approximation, the increase in content of any composition of 1% zirconia will increase the optimum firing temperature by about 5° to 10°F.

EXAMPLE 3

The following raw materials were weighed out and mixed in a twin-shell blender:

| | | |
|---|---|---|
| Silica | 286 | Parts |
| Feldspar | 8 | do. |
| ZnO | 12½ | do. |
| Potassium Nitrate | 51 | do. |
| Boric Acid | 22½ | do. |
| $Li_2CO_3$ | 125 | do. |
| Zircon | 196 | do. |
| Nepheline Syenite | 1¼ | do. |
| Calcined Alumina | 139 | do. |

The batch was placed in a rotary smelter and smelted at 1,370°C. for 1 hour. It was then poured into water to frit it, and the frit was allowed to dry. The frit had the following composition:

| | | |
|---|---|---|
| $Li_2O$ | 6.89 | Percent |
| $K_2O$ | 3.36 | do. |
| $Na_2O$ | 0.05 | do. |
| ZnO | 2.91 | do. |
| $B_2O_3$ | 1.71 | do. |
| $Al_2O_3$ | 19.71 | do. |
| $SiO_2$ | 48.28 | do |
| $ZrO_2$ | 17.63 | do. |

The frit was then dried and ball milled for 16 hours. Subsequently, 100 parts of the ball-milled frit, 0.2 parts bentonite, 4 parts kaolin clay and 40 parts of water were ball milled together for 1 hour and the mixtures sprayed onto several bisquefired cordierite bodies of the composition of Example 1.

The body has been bisqued at 1,230°C., and the coating was applied to a weight of ½ to 1 gram per square inch of surface area. The coated bodies were divided into six groups; and one group was fired according to Firing Cycle 1, the second according to Firing Cycle 2 and so on for each of the six firing cycles described above. In each of the six groups of bodies, the result was a moderate gloss, white, opaque, craze-free, non-porous, acid-resistant, semi-crystalline glaze on the tile body. The glaze had an acid resistance of AA when tested according to 10$^{-Test}$ $^C$–282–67. The coefficient of expansion of the glaze in each case was observed to be about 2.8 to 3.0 × 10$^{-6}$/°C. which produced a compatible glaze on the cordierite body which had a coefficient of thermal expansion of about 3.5 to 4.0 × 10$^{-6}$/°C.

EXAMPLE 4

The following raw materials were weighed out and mixed in a twin-shell blender:

| | | |
|---|---|---|
| Silica | 327 | Parts |
| Feldspar | 9¼ | do. |
| ZnO | 7½ | do. |
| Potassium Nitrate | 58½ | do. |
| Boric Acid | 25½ | do. |
| $Li_2CO_3$ | 143 | do. |
| Zircon | 144 | do. |
| Nepheline Syenite | 1½ | do. |
| Calcined Alumina | 134 | do. |

The batch was placed in a rotary smelter and smelted at 1,370°C. for 1 hour. It was then poured into water to frit it, and the frit was allowed to dry. The frit had the following composition:

| | | |
|---|---|---|
| $Li_2O$ | 7.78 | Percent |
| $K_2O$ | 3.79 | do. |
| $Na_2O$ | 0.06 | do. |
| ZnO | 1.00 | do. |
| $B_2O_3$ | 1.92 | do. |
| $Al_2O_3$ | 21.62 | do. |
| $SiO_2$ | 51.05 | do. |
| $ZrO_2$ | 12.77 | do. |

The frit was then dried and ball milled for 16 hours. Subsequently, 100 parts of the ball-milled frit, 0.2 parts bentonite, 4 parts kaolin clay and 40 parts of water were ball milled together for one hour and the mixtures sprayed onto several bisquefired cordierite bodies of the composition of Example 1.

The body had been bisqued at 1,230°C., and the coating was applied to a weight of ½ to 1 gram per square inch of surface area. The coated bodies were divided into six groups; and one group was fired according to Firing Cycle 1, the second group according to Firing Cycle 2 and so on for each of the six firing cycles described above. In each of the six groups of bodies, the result was a moderate gloss, white, opaque, craze-free, non-porous, acid-resistant, semi-crystalline glaze on the tile body. The glaze had an acid resistance of AA when tested according to ASTM Test C–282–67. The coefficient of expansion of the glaze in each case was observed to be about 2.8 to 3.0 × 10$^{-6}$/°C. which produced a compatible glaze on the cordierite body which had a coefficient of thermal expansion of about 3.5 to 4.0 × 10$^{-6}$/°C.

EXAMPLES 5 THROUGH 8

The following raw material batches were weighed out and mixed in a twin-shell blender:

|  | Example 5 | Example 6 | Example 7 | Example 8 |
|---|---|---|---|---|
| Silica | 1268 Parts | 1035 Parts | 1394 Parts | 1150 Parts |
| Zinc Oxide | 100 do. | 92 do. | 100 do. | 92 do. |
| Potassium Nitrate | 189 do. | 172 do. | 189 do. | 172 do. |
| Boric Acid | 112 do. | 102 do. | 112 do. | 102 do. |
| $Li_2CO_3$ | 779 do. | 711 do. | 779 do. | 711 do. |
| Zircon | 357 do. | 714 do. | 357 do. | 714 do. |
| Calcined Alumina | 824 do. | 753 do. | 698 do. | 637 do. |

The batches were separately placed in a rotary smelter and smelted at 1,370°C. for 1 hour. Each was then poured into water to frit it, and the frit was allowed to dry. The frits had the following compositions:

|  | Example 5 | Example 6 | Example 7 | Example 8 |
|---|---|---|---|---|
| $Li_2O$ | 10.46 | 9.55 | 10.46 | 9.55 |
| $K_2O$ | 2.93 | 2.67 | 2.93 | 2.67 |
| ZnO | 3.34 | 3.06 | 3.34 | 3.06 |
| $B_2O_3$ | 2.09 | 1.91 | 2.09 | 1.91 |
| $Al_2O_3$ | 27.18 | 24.81 | 23.00 | 21.00 |
| $SiO_2$ | 46.00 | 42.00 | 50.18 | 45.81 |
| $ZrO_2$ | 8.00 | 16.00 | 8.00 | 16.00 |

The frit was then dried and ball milled for 16 hours. Subsequently, 100 parts of the ball-milled frit, 0.2 parts bentonite, 4 parts kaolin clay and 40 parts of water were ball milled together for one hour and the mixtures sprayed onto several bisquefired cordierite bodies of the composition of Example 1.

The body had been bisqued at 1,230°C. and the coating was applied to a weight of ½ to 1 gram per square inch of surface area. The coated bodies were divided into two groups; one group was fired according to Firing Cycle 3, the other according to Firing Cycle 5. In each of the bodies, the result was a moderate gloss, white, opaque, craze-free, non-porous, acid-resistant, semi-crystalline glaze on the tile body. The glaze had an acid resistance of A when tested according to ASTM Test C-282-67. The coefficient of expansion of the glaze in each case was observed to be about 2.8 to 3.0 × $10^{-6}$/°C. which produced a compatible glaze on the cordierite body which had a coefficient of thermal expansion of about 3.5 to 4.0 × $10^{-6}$/°C.

The presence of substantial amounts of a zirconia containing phase in the glazes herein disclosed has been documented by X-ray diffraction analysis. Examples 5, 6, 7 and 8 were examined on a General Electric Co. XRD-5 diffraction unit from 0 – 10° to 60°. All samples showed "stuffed quartz" as the major phase, as indicated by the diffraction peaks at $d$ = 3.53 and $d$ = 1.91. Monoclinic zirconia was a substantial secondary phase, as revealed by the diffraction peaks at $d$ = 3.6 and $d$ = 2.83. The diffraction patterns of both phases agree with those given in the ASTM powder diffraction file, cards 12–709 and 13–307, respectively (published by American Society for Testing and Materials, 1916 Race Street, Philadelphia, Penna. 19103).

EXAMPLES 9 THROUGH 11

The following raw material batches were weighed out and mixed in a twin-shell blender:

|  | Example 9 | Example 10 | Example 11 |
|---|---|---|---|
| Silica | 292½ Parts | 333 Parts | 292½ Parts |
| Zinc Oxide | 22 do. | 25 do. | 22 do. |
| Potassium Nitrate | 28 do. | 32 do. | 20¼ do. |
| Boric Acid | 23 do. | 26½ do. | 23 do. |
| $Li_2CO_3$ | 128 do. | 146 do. | 128 do. |
| Zircon | 201 do. | 114½ do. | 201 do. |
| Calcined Alumina | 142½ do. | 162½ do. | 142½ do. |
| Nepheline Syenite | 1¼ do. | 1½ do. | 1¼ do. |
| Feldspar | 8¼ do. | 9¼ do. | 8¼ do. |

The batches were separately placed in a rotary smelter and smelted at 1,370°C. for 1 hour. Each was then poured into water to frit it, and the frit was allowed to dry. The frits had the following compositions:

|  | Example 9 | Example 10 | Example 11 |
|---|---|---|---|
| $Li_2O$ | 6.97 | 8.05 | 7.00 |
| $K_2O$ | 1.86 | 2.18 | 1.38 |
| $Na_2O$ | 0.04 | 0.05 | 0.04 |
| ZnO | 2.97 | 3.42 | 2.99 |
| $B_2O_3$ | 1.74 | 2.04 | 1.75 |
| $Al_2O_3$ | 19.26 | 22.24 | 19.35 |
| $SiO_2$ | 48.91 | 51.48 | 49.15 |
| $ZrO_2$ | 18.25 | 10.54 | 18.33 |

The frit was then dried and ball milled for 16 hours. Subsequently, 100 parts of the ball-milled frit, 0.2 parts bentonite, 4 parts kaolin clay and 40 parts water were ball milled together for 1 hour and the mixtures sprayed onto several bisquefired cordierite bodies of the composition of Example 1. The body had been bisqued at 1,230°C., and the coating was applied to a weight of ½ to 1 gram per square inch of surface area. The coated bodies were divided into six groups; and one group was fired according to Firing Cycle 1, the second group according to Firing Cycle 2 and so on for each of the six firing cycles described above. In each of the six groups of bodies, the result was a moderate gloss, white, opaque, craze-free, non-porous, acid-resistant, semi-crystalline glaze on the tile body. The glaze had an acid resistance of AA when tested according to ASTM Test C-282-67. The coefficient of expansion of the glaze in each case was observed to be about 2.8 to 3.0 × $10^{-6}$/°C., which produced a compatible glaze on the cordierite body which had a coefficient of thermal expansion of about 3.5 to 4.0 × 10⁻⁶/°C.

The optimum firing temperature for the glaze composition shown in Example 9, containing 18.24% zirconia, is 2,050°F. (1,121°C.) for 1 hour. This is roughly equivalent to firing at Cone 4. In comparison, the optimum firing temperature for the glaze composition shown in Example 10, containing 10.54% zirconia, is 1,980°F. (1,080°C.). This is roughly equivalent to firing at Cone 1. Therefore, by selecting the $ZrO_2$ concentration in the glaze composition, the firing temperature can be independently adjusted. This is of great commercial value because it permits adjustment of the firing temperature to match the conditions obtainable in currently installed kilns.

All of the resulting glazes are low satin or matte in appearance. They are uniform from firing to firing which is of great importance in the whiteware applications where the firing profile in production kilns is generally non-uniform from side to side and top to bottom in the kiln. The chemical durability of these glazes is superior to low-zircon formulations. Using the Porcelain Enamel Institute test, resistance ratings of A to AA were achieved for all of the resulting glazes whereas low-zircon formulations generally exhibit a B rating on the same test.

All of these glazes are compatible with low-expansion substrates having a coefficient of expansion of $2 \times 10^{-6}$ and above. Another primary advantage of these glazes is that they can be fired about 2,000°F. without a generation of surface defects and imperfections. For industrial whiteware applications, this is a real commercial advantage since it is generally impractical for whiteware manufacturers to modify existing firing equipment to achieve the rather delicate temperature controls often required in low-expansion glazing work. Having thus described the invention, what is claimed is:

1. As component for glazing low-expansion ceramic whiteware with a substantially non-porous, acid-resistant, opaque glaze, a substantially water-insoluble ceramic frit being substantially entirely in the vitreous state as frit particles, said frit after melting into a fluent vitreous state being thermally autocrystallizable to a low-expansion, semi-crystalline glass-ceramic glaze containing zirconia or zircon as one of the crystalline phases and having a coefficient of thermal expansion of less than $5 \times 10^{-6}$/°C., said frit consisting essentially of:

| Ingredient | Percent by Weight |
|---|---|
| $Li_2O$ | about 3 to 22% |
| MgO | about 0 to 6%, 0.74 part of MgO replacing 1 part of $Li_2O$ when MgO is used, but a minimum of 4% $Li_2O$ + MgO being present |
| $Al_2O_3$ | about 17 to 38% |
| $SiO_2$ | about 26 to 70%, the subtotal sum of $Li_2O$, MgO, $Al_2O_3$ and $SiO_2$ being 70 to 90% |
| $ZrO_2$ | about 6 to 25% |
| Flux | about 4 to 19%. | wherein said flux is selected from the group consisting of: $B_2O_3$, $K_2O$, F, PbO, $Na_2O$, CaO, SrO, ZnO, BaO up to 5% or mixtures of same.

2. The component of claim 1 having the composition:

| Ingredient | Percent by Weight |
|---|---|
| $Li_2O$ | 5 to 15% |
| MgO | 0 to 2½%, 0.74 part of MgO replacing 1 part of $Li_2O$ when MgO is used. |
| $Al_2O_3$ | 17 to 31% |
| $SiO_2$ | 38 to 60%, the subtotal sum of $Li_2O$, MgO, $Al_2O_3$ and $SiO_2$ being 70 to 88% |
| $ZrO_2$ | about 8 to 20% |
| Flux | about 4 to 11% | wherein said flux is selected from the group consisting of: $B_2O_3$, $K_2O$, F, PbO, $Na_2O$, CaO, SrC, ZnO, BaO up to 5% or mixtures of same.

3. A composition for glazing ceramic ware, said composition comprising 100 parts of the frit of claim 1; 0 to 15 parts ceramic clay (other than a montmorillonite clay); 0 to 5 parts montmorillonite; 0 to 20 parts ceramic colorant; 0 to 20 parts ceramic opacifier; 0 to about 0.4 part electrolyte; and 0 to 90 parts water.

4. The composition of claim 3 wherein preparatory to application to a ceramic body, not substantially less than about 97% of all ingredients pass a 325-mesh screen.

5. The composition of claim 3 in the form of a slip containing 15 to 90 parts water.

6. The component of claim 1 useful at a firing temperature of about 100° to 300°C, above the liquidus of the component.

7. The component of claim 1 useful at a firing temperature of about 975° to 1250°C.

* * * * *